(12) United States Patent
Adarsh et al.

(10) Patent No.: US 8,332,415 B1
(45) Date of Patent: Dec. 11, 2012

(54) DETERMINING SPAM IN INFORMATION COLLECTED BY A SOURCE

(75) Inventors: Anurag Adarsh, Bangalore (IN); Piyush Janawadkar, Bangalore (IN)

(73) Assignee: Google Inc., Mountain View, CA (US)

( * ) Notice: Subject to any disclaimer, the term of this patent is extended or adjusted under 35 U.S.C. 154(b) by 68 days.

(21) Appl. No.: 13/049,113

(22) Filed: Mar. 16, 2011

(51) Int. Cl.
G06F 7/00 (2006.01)
G06F 17/30 (2006.01)
(52) U.S. Cl. .................. 707/749; 707/754; 707/758
(58) Field of Classification Search .................. 707/749
See application file for complete search history.

(56) References Cited

U.S. PATENT DOCUMENTS

| | | | |
|---|---|---|---|
| 7,890,441 B2 * | 2/2011 | Prakash et al. | 706/20 |
| 8,001,195 B1 * | 8/2011 | Kalinin | 709/206 |
| 8,136,034 B2 * | 3/2012 | Stanton et al. | 715/255 |
| 2002/0199095 A1 * | 12/2002 | Bandini et al. | 713/151 |
| 2006/0004748 A1 * | 1/2006 | Ramarathnam et al. | 707/6 |
| 2006/0149820 A1 * | 7/2006 | Rajan et al. | 709/206 |
| 2006/0195701 A1 * | 8/2006 | Dew et al. | 713/188 |
| 2006/0294155 A1 * | 12/2006 | Patterson | 707/200 |
| 2008/0086555 A1 * | 4/2008 | Feinleib | 709/224 |
| 2009/0089279 A1 * | 4/2009 | Jeong et al. | 707/5 |
| 2011/0131223 A1 * | 6/2011 | Patterson | 707/758 |

OTHER PUBLICATIONS

Ioannis Kanaris, "Words vs. Character N-Grams for Anti-Spam Filtering", 2006.*
Alexandros Ntoulas, "Detecting Spam Web Pages through Content Analysis", 2006.*

* cited by examiner

*Primary Examiner* — Binh V Ho
(74) *Attorney, Agent, or Firm* — Fish & Richardson P.C.

(57) ABSTRACT

Methods, computer-readable media, and systems for determining spam in information collected by a source are described. A frequency of occurrence of a phrase included in text items received from a source is determined. The text items are associated with business entities and do not include any spam. Another frequency of occurrence of a phrase included in text items received from another source is determined. The text items received from the other source may or may not include spam. From the frequencies, likelihoods that a phrase is spam are determined. From the likelihoods, another likelihood that a different text item includes spam is determined.

27 Claims, 6 Drawing Sheets

DETERMINING SPAM IN INFORMATION COLLECTED BY A SOURCE

BACKGROUND

This specification relates to evaluating sources that collect information, for example, to determine if the information includes spam.

Search engines can be configured to receive search queries provided by users and to provide search results that satisfy the search queries. A search engine can communicate with multiple client devices, for example, computers, through one or more networks, such as the Internet. In some situations, the search engine can search from an index of resources when it receives a search query. The index can be created by crawling multiple resources, each of which is stored, for example, in one or more computer systems. In addition to identifying the resources, the search engine can additionally rank the resources included in the search results according a relevance of each search result to the search query.

The resources can include information describing business entities that offer services, products, or both. In some situations, a business entity can have a dedicated resource, for example, a website addressed by a unique uniform resource locator (URL), which the search engine can crawl and index. As an alternative or in addition, a business entity can provide its business information to one or more of several sources that collect information about such entities, for example, the Yellow Pages. A source can store the information (including information describing business entities) in a computer system. A search engine can crawl and index the stored information. Alternatively, or in addition, the source can provide the stored information to the search engine. When the search engine receives a search query that references a product, service (or both), the search engine can identify, from the index, relevant business information collected and stored by the source.

SUMMARY

This specification describes technologies relating to determining spam in information collected by a source.

In general, one innovative aspect of the subject matter described here can be implemented as a method performed by data processing apparatus. A first frequency of occurrence of a phrase included in one or more of multiple first text items received from a first source is determined. The multiple first text items are associated with multiple first business entities. The multiple first text items do not include any spam text items. A second frequency of occurrence of the phrase included in one or more of multiple second text items received from a second source is determined. The multiple second text items are associated with multiple second business entities. A likelihood that the phrase is spam based at least partially on the first frequency, the second frequency, a count of the multiple first text items and a count of the multiple second text items. A likelihood that a different text item received from the second source and that includes the phrase is spam is determined based at least in part on the likelihood that the phrase is spam.

This, and other aspects, can include one or more of the following features. The likelihood that the phrase is spam can be determined based on a first ratio of the first frequency to the count of the plurality of first text items and a second ratio of the second frequency to the count of the plurality of second text items. Determining the likelihood that the phrase is spam can include determining a first ratio of the first frequency to the count of the plurality of first text items, determining a second ratio of the second frequency to the count of the plurality of second text items, determining a likelihood that text items received from the second source includes spam, and determining the likelihood based at least partially on the first ratio, the second ratio, and the likelihood that text items received from the second source includes spam. Determining a first ratio of the first frequency to the count of the multiple first text items can include dividing the first frequency by the count of the plurality of first text items. Determining a second ratio of the second frequency to the count of the multiple second text items can include dividing the second frequency by the count of the plurality of second text items. Determining the likelihood that the text items received from the second source includes spam can include identifying a subset of the multiple second text items received from the second source, and determining the likelihood that the different text item received from the second source includes spam as a ratio of a count of second text items in the subset to which the signal is associated to a count of second text items in the subset. Each second text item in the subset can be associated with a signal that indicates whether or not the second text item in the subset is spam. A second text item that includes the phrase can include multiple words. The method can further include determining multiple phrases from the multiple words included in the received second text item, and for each of the multiple phrases, determining a respective confidence measure that represents a confidence that a phrase is logically coherent. The multiple phrases can include the phrase. Each of the multiple phrases can include one or more of the words included in the multiple words. Determining the respective confidence measure for the phrase can include, for each of the multiple phrases, determining a respective frequency of occurrence of each phrase included in the plurality of second text items, and associating the respective frequency of occurrence as the respective confidence measure for each phrase. The method can further include identifying two of more phrases of the plurality of phrases that have an equal count of words, identifying a phrase of the two or more phrases that has the largest confidence measure among the two or more phrases, and designating the identified phrase as the phrase. The multiple first text items and the multiple second text items represent a title of the corresponding multiple first business entities and the corresponding multiple second business entities, respectively. The multiple first text items and the multiple second text items can represent an attribute describing a category of the corresponding multiple first business entities and the corresponding multiple second business entities, respectively. Each of multiple second text items is associated with a first format. The method can further include determining that a particular second text item is of a second format that is different from the first format and is incompatible with the second format, and in response to the determining, designating the particular second text item as spam. The first format is text and the second format is numeric. Each first and second text item can include one or more words. The phrase includes at least one word that is included in the text item. The method can further include designating one or more sources as sources that provide text items that do not include any spam text items, determining that the first source is included in the designated one or more sources, and in response to the determining, determining that the first text items do not include any spam text items.

Another innovative aspect of the subject matter described here can be implemented as a computer-readable medium storing computer program instructions, which when executed by data processing apparatus causes the apparatus to perform the methods described here. Yet another innovative aspect of the subject matter described here can be implemented as a system that includes data processing apparatus and a computer-readable medium storing computer program instructions executable by the data processing apparatus to perform the operations described here.

Particular embodiments of the subject matter described in this specification can be implemented so as to realize one or more of the following advantages. By comparing likelihoods of occurrences of phrases included in text items that are received from an untrusted source and of those received from trusted sources, a likelihood that a text item received from the untrusted source includes spam, can be determined. In response to determining that the text item received from an untrusted source is spam, search results that include the text item or that include text items received from the untrusted source or both can be adjusted. Sources can be encouraged to not include spam in the information that the sources collect. Alternatively, or in addition, sources can indirectly be discouraged from including spam in the information that the sources collect, for example, by demoting/culling the search results that include information from such sources because the information likely includes spam. In addition, search results provided to users, which include information about business entities, can include little or no spam. Unfair advantages gained by businesses that include spam in their information over businesses that do not can be decreased or eliminated. Further, the techniques described can be implemented as a moderation system to determine whether information includes spam.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system configured to determine a likelihood that information describing business entities, which is received from a source that collects such information, is spam. The system receives information (for example, text items that include words, phrases, numbers, characters, and the like) describing business entities from multiple sources. Some of the sources are designated as trusted sources. Information received from a trusted source is considered to not include spam. A source that is not a trusted source is an untrusted source, and information received from an untrusted source may or may not include spam.

For a text item received from an untrusted source, the system determines multiple phrases that are included in the text item. For each phrase, the system determines a likelihood that the phrase is spam based on frequencies of occurrence of the phrase included in all text items received from a trusted source and the untrusted source. The system then determines a likelihood that the text item itself is spam based at least in part on the likelihoods associated with the multiple phrases. Techniques to identify phrases included in text items and to determine likelihoods for the phrases are described later.

Based on such likelihoods associated with untrusted sources, the system can determine and associate measures of spam in the information about business entities received from the untrusted sources. If a search engine determines that a resource that includes information received from the untrusted source satisfies a search query received from a user, then the search engine can adjust a rank of the resource based on the measure of spam that the system has determined for the text item included in the resource or the untrusted source from which the text item was received or both. Details of some implementations of the system are described with reference to the following figures.

Figure 1:
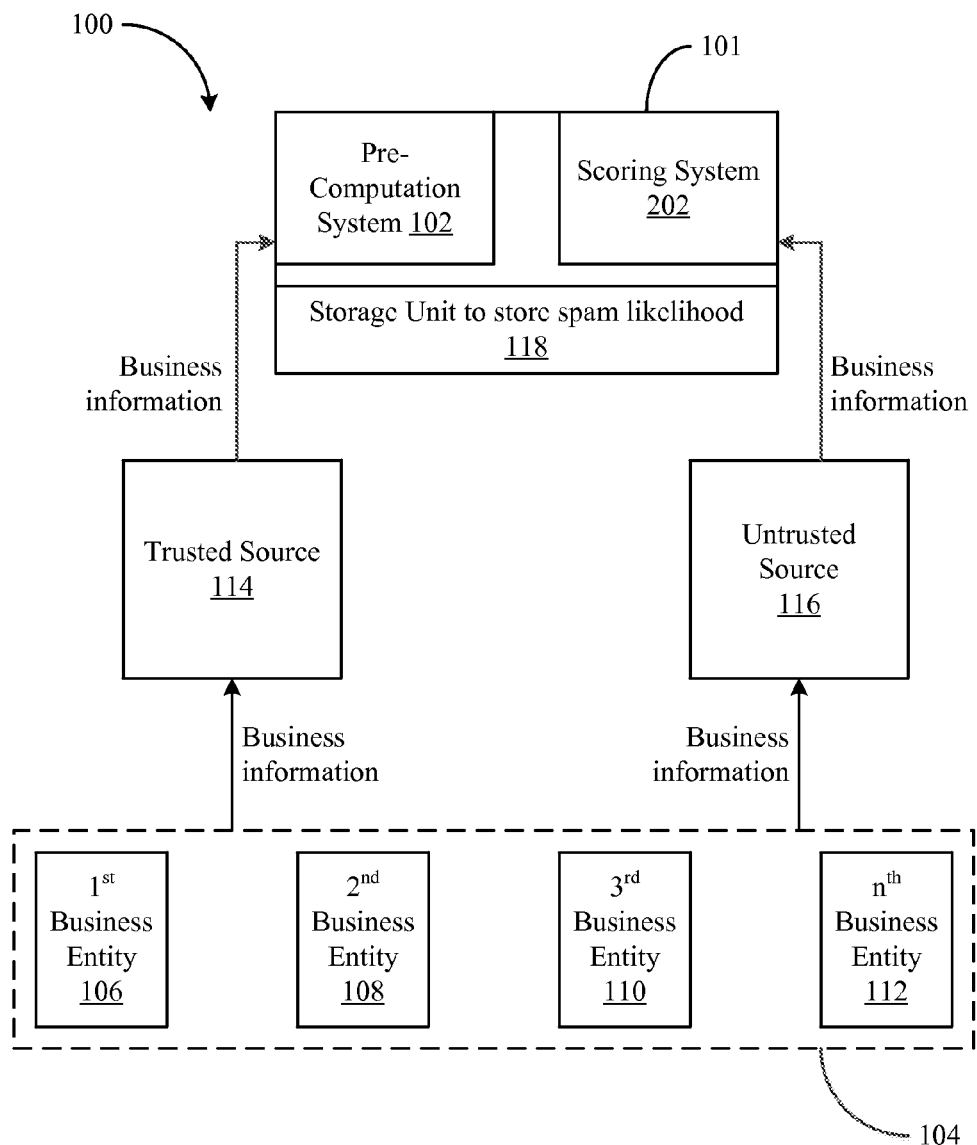
FIG. 1 is an example of an environment including a system to determine likelihoods that information about business entities includes spam.

FIG. 1 is an example of an environment 100 including a system 101 to determine likelihoods that information about business entities includes spam. In the context of a business entity, information that skews the identity of or does not accurately represent the business entity or both is considered spam. For example, if the business entity is a manufacturer of widgets, and information describing the manufacturer contains the text item "best manufacturer of widgets," then the word "best" may convey more than merely the business category of the entity, and consequently may skew the entity's identity. Whereas "a manufacturer of widgets" would objectively describe the business entity, the addition of the word "best" subjectively describes the business entity and possibly inaccurately represents the business entity. Such information is described as spam.

In another example, if the business category includes the same words or phrases multiple times, then the frequency of occurrence of the words can affect a search result and skew the entity's identity. If the information contained text in a category that has a numeric format (for example, telephone number category), then the information may be an inaccurate representation of the business entity and, for that reason, may be spam. In general, certain semantics and norms are associated with the business information. Any information which conceptually disagrees with the designated semantics and norms can be spam. Examples of spam in information describing business entities, particularly titles of business entities, include "cheap hotels," "discounts," Dr. ABC—555 777 8888." Spam in categories of business entities include "City X," "sale," "City A B C D," "Hotel X in City Y, Luxury Hotel in City Y The system 101 includes a pre-computation system 102 and a scoring system 202 (described with reference to FIG. 2). The environment 100 of FIG. 1 additionally includes multiple business entities (collectively 104) including, for example, first business entity 106, second business entity 108, third business entity 110, $n^{th}$ business entity 112. Each of the multiple business entities 104 provides respective information to one or more sources. A source can be, for example, a company or a service provider that collects information (including business information), stores collected information (for example, in electronic form), and provides the information to interested parties including consumers, other businesses, and search engines.

The environment 100 includes a trusted source 114 and an untrusted source 116. If the system 101 trusts that information received from a source does not include spam, then the system 101 designates that source as a trusted source. The system 101 can designate a source as a trusted source based on, for example, a reputation of the source or previous dealings with the source or combinations of them. Sources that the pre-computation system 102 does not designate as trusted sources are untrusted sources. A trusted source and an untrusted source can be associated with respective identifiers. Whether the source is trusted or untrusted can be identified based on the identifiers. In addition, each source can be identified by a corresponding identifier. In some implementations, designations of a source as trusted or untrusted can be manually configured in the system 101. Alternatively, or in addition, the system 101 can be configured to determine if a source is trusted or untrusted based on a reputation of the source, i.e., through previous interactions between the system 101 and the source.

A business entity can have several attributes, for example, title, business category, telephone number, address, URL pointing to a website, and the like. The information that the source collects can include a value for most or all of the attributes. For example, different sources can have different attributes, but all sources have the same subset of attributes, such as a title (i.e., a name of the business), a business category, and an address. Each business entity can provide values that correspond to the subset attributes.

In some situations, sources can collect information from business entities in electronic forms, for example, in XML format. An electronic form can include fields that correspond to the attributes into which values, for example, text items can be provided. For example, the text item that corresponds to a business entity can be "Company X" and the text item that corresponds to the entity's business category can be "Website Designers in Y," where "Y" is a name of a city. Using such electronic forms, for example, both the trusted source 114 and the untrusted source 116 can collect business information from the multiple business entities 104, and transmit the collected information to the system 101. The system 101 can extract the information, for example, by parsing the electronic forms in which the information is received.

The pre-computation system 102 can identify words or phrases (or both) included in a text item that describes a business entity. In some implementations, for each word or phrase included in text items received from the untrusted source 116, the pre-computation system 102 can determine a corresponding spam likelihood. In other words, if the pre-computation system 102 determines that a text item received from the untrusted source 116 includes multiple words, then the pre-computation system 102 can divide the text item into one or more words or phrases or both (FIG. 3), assign a confidence measure to each phrase that indicates whether the phrase is an important phrase (FIG. 4), and determine a likelihood that each phrase is spam (FIG. 5). In some implementations, rather than determining a confidence measure for all words into which a text item is divided, the pre-computation system 102 can determine confidence measures only for phrases that contain at least a minimum count of words.

The system 101 can include a storage unit 118 to store the spam likelihood for each such phrase. In some implementations, a storage unit 118 can include one or more computer-readable databases that store data representing each phrase and a corresponding numerical value representing a spam likelihood, for example, in one or more computer-readable tables.

In some implementations, the storage unit 118 can reside in and be a component of the system 101, while in other implementations, the unit 118 can be external to and be operatively coupled to the system 101. As described with reference to FIG. 2, the system 202 can be configured to assign spam likelihoods to information about new business entities received from untrusted sources.

Figure 2:
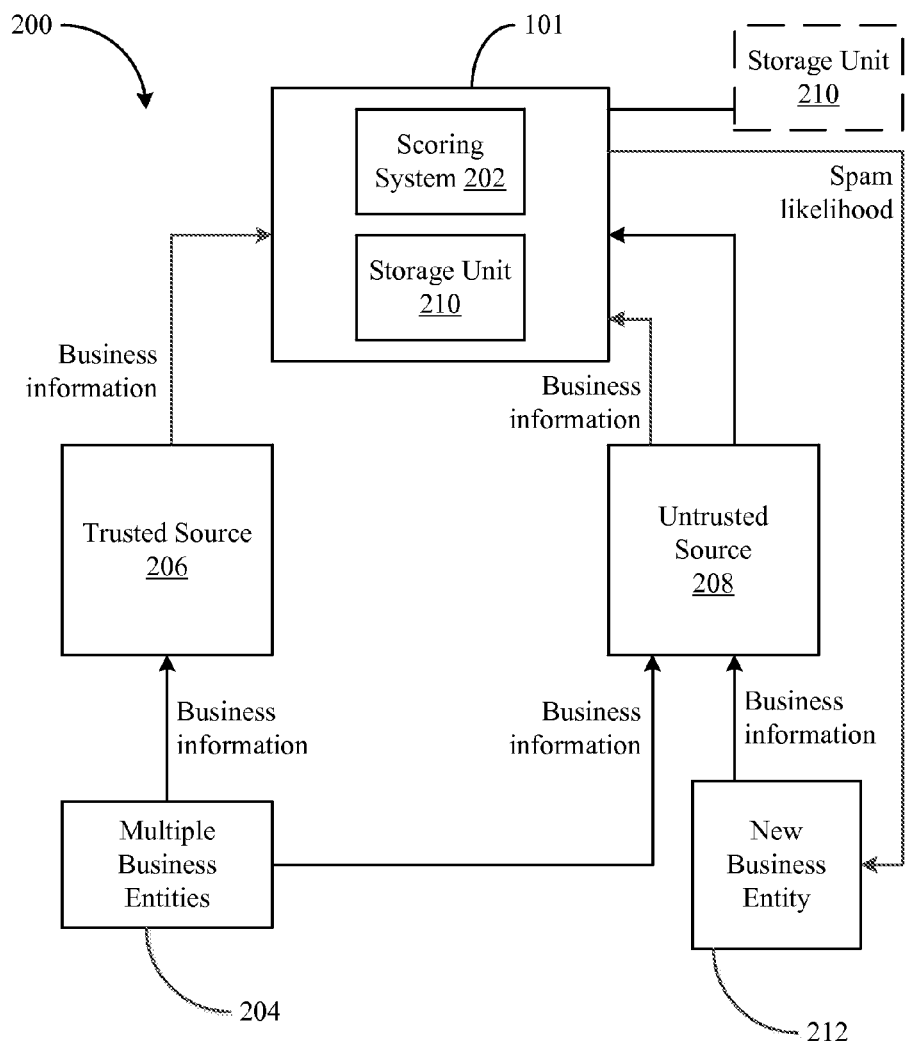
FIG. 2 is an example of an environment including a scoring system to assign spam likelihoods to information about new business entities received from untrusted sources.

FIG. 2 is an example of an environment 200 including a scoring system 202 to assign spam likelihoods to business information about new business entities received from untrusted sources. The scoring system 202, which is included in system 101), receives business information describing multiple business entities 204 from multiple sources including a trusted source 206 and an untrusted source 208. The scoring system 202 includes a storage unit 210 (similar to the storage unit 118 of FIG. 1) that is configured to store spam likelihoods for words or phrases or both that are included in text items that are received from the untrusted source 208.

In some implementations, the scoring system 202 receives business information about a new business entity 212 from the untrusted source 208. If the untrusted source 208 collects new or updated information about an existing business entity, which is included in the multiple business entities 204, then the existing business entity can be considered a new business entity.

Figure 6:
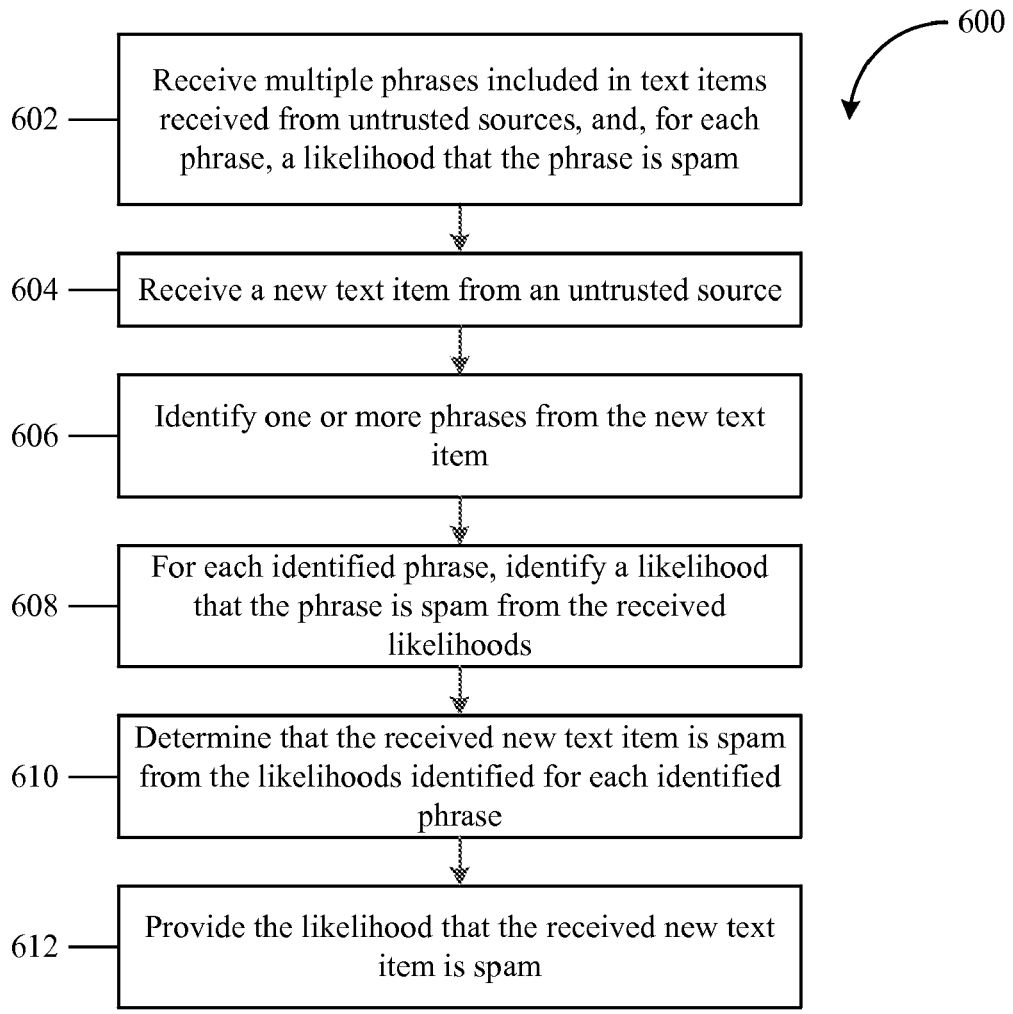
FIG. 6 is flowchart of a process for determining that business information received from a source is spam.

When the scoring system 202 receives business information (i.e., one or more text items) describing the new business entity 212 from the untrusted source 202, the scoring system 202 can determine a likelihood that the information is spam, based at least in part on the spam likelihood of the one or more words or phrases (or both) included in the text items received from the new business entity 212 (FIG. 6). In some implementations, the storage unit 210 can additionally store the likelihood that the information provided by a new business entity is spam by associating a numerical value, which represents the likelihood, with an identifier, which represents the new business entity.

Figure 3:
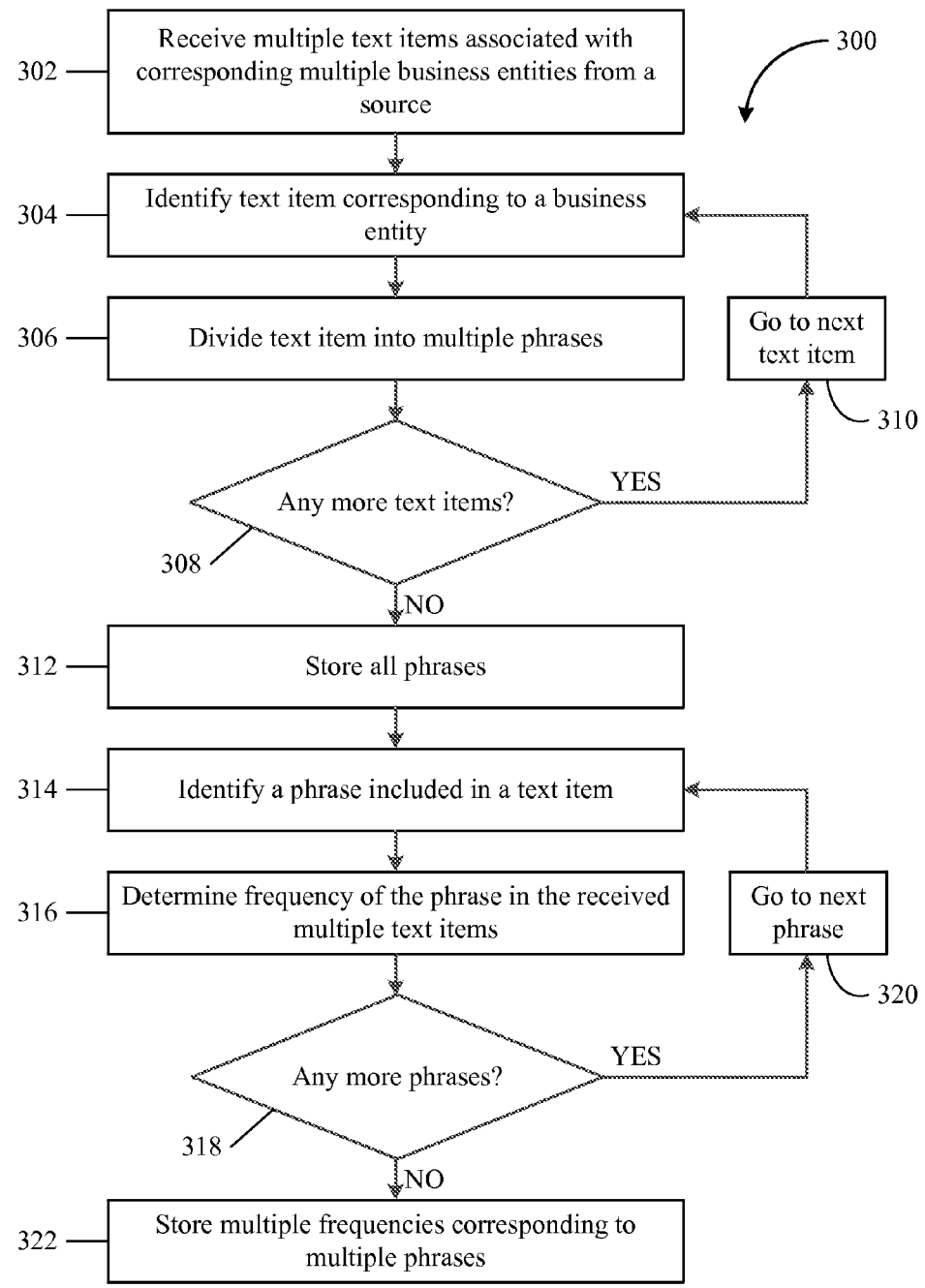
FIG. 3 is a flowchart of an example process to identify phrases included in business information received from a source.

FIG. 3 is a flowchart of an example process 300 to identify phrases included in business information received from a source. The process 300 can be implemented as computer software instructions stored on a computer-readable medium and executable by data processing apparatus. The process 300 receives multiple text items associated with corresponding multiple business entities from a source (step 302). For example, the system 101 receives multiple text items associated with corresponding multiple business entities from a source. As described previously, a source can associate multiple attributes to a business entity (for example, title, business category, address, and the like), and provide a value for most or all of the attributes. The system 101 can receive values of such attributes from the multiple sources.

The following steps of process 300 are described as being performed on text items received from a trusted source. In series or in parallel, a similar process is also performed on text items received from an untrusted source. The process 300 identifies a text item that corresponds to a business entity (step 304). For example, the system 101 identifies a value of an attribute (for example, corresponding to title category) received from a trusted source. Further, the system 101 is configured to separately analyze values of attributes that are of the same type. For example, the system 101 analyzes values of all title categories separately, values of all address categories separately, and so on. The values of attributes described with reference to process 300 are of the same type.

The process 300 divides the text item into multiple phrases (step 306). In some implementations, an n-gram analysis is performed on each text item to divide the text item into 1-grams, 2-grams, 3-grams, and so on. For example, a phrase includes multiple consecutive words in the text item. The system 101 can divide the text item "website designers in Y" into the following words or phrases: "website," "designers," "in," "Y," "website designers," "designers in," "in Y," "website designers in," "designers in Y," "website designers in Y." In some implementations, the system 101 can limit a number of words into which the system 101 will divide a text item (for example, a changeable threshold of five words).

After dividing a text item into multiple phrases, the process 300 checks to determine if the trusted source provided additional text items (step 308). If yes (decision branch "YES"), then the process 300 identifies the next text item (step 310) and repeats steps 304 and 306 to identify the next item and to divide the next text item into multiple phrases, respectively. The system 101 then stores all the phrases (step 312), for example, in a computer-readable and computer-searchable storage medium. Similarly, the system 101 identifies all text items received from the untrusted source, divides each text item into multiple phrases, and stores the phrases in the storage medium.

The process 300 subsequently identifies a phrase included in a text item (step 314), and determines a frequency of the phrase included in the multiple text items received from the trusted source (step 316). For example, the system 101 determines that, when all the text items received from the trusted source were divided into phrases, the phrase "website designers" occurred 40 times.

The process 300 can check for additional phrases obtained by dividing a text item (step 318). If found (decision branch "YES"), then the process 300 can identify the next phrase (step 320), and repeat steps 314 and 316 to determine a frequency of the phrase included in the received multiple text items. For example, the system 101 determines that the phrase "designers in" occurred 15 times, the phrase "in Y" occurred 10 times, and the phrase "Y" occurred 140 times. The process 300 can store the multiple frequencies corresponding to the multiple phrases in the storage medium (step 322).

The stored frequencies correspond to frequencies of phrases included in text items received from the trusted source. The system 101 can implement steps similar to steps 314, 316, 318, 320, and 322 on the phrases included text items received from the untrusted source to determine the multiple frequencies of occurrences of the multiple phrases in the text items received from the untrusted source.

In some implementations, the system 101 determines frequencies of only those phrases that are determined to be important. For example, the system 101 identifies words or phrases that are at the beginning, in the middle, end (or at all three positions) of the text item, and identifies frequencies of only those words or phrases or both that are above a threshold frequency. Also, for example, for phrases included in text items received from the untrusted source, the system 101 determines frequencies of contiguous words where each word had a frequency above a threshold in the untrusted source. An example implementation is described with reference to FIG. 4.

Figure 4:
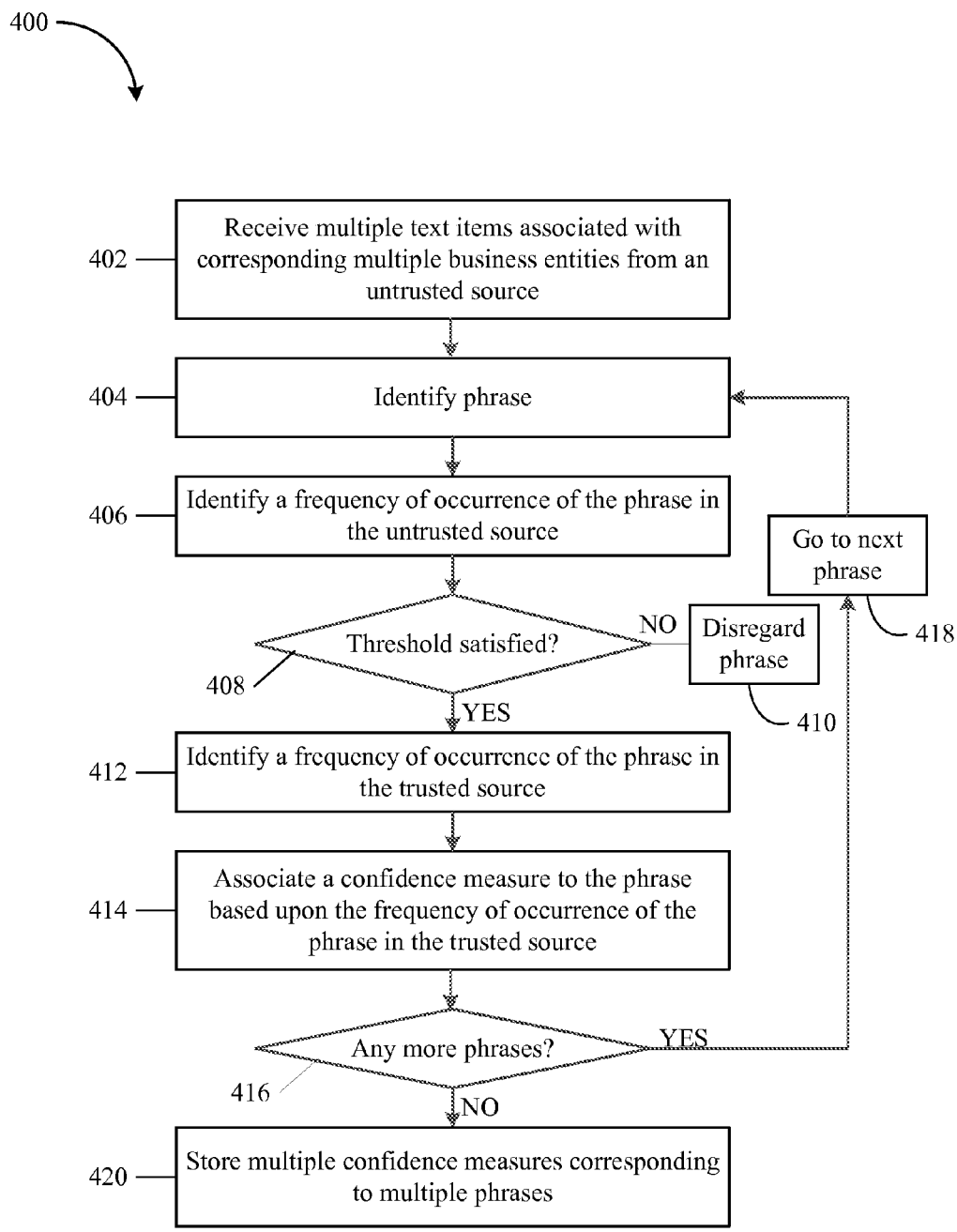
FIG. 4 is a flowchart of an example process for assigning a confidence measure to a phrase indicating whether the phrase is a logically coherent phrase.
Figure 5:
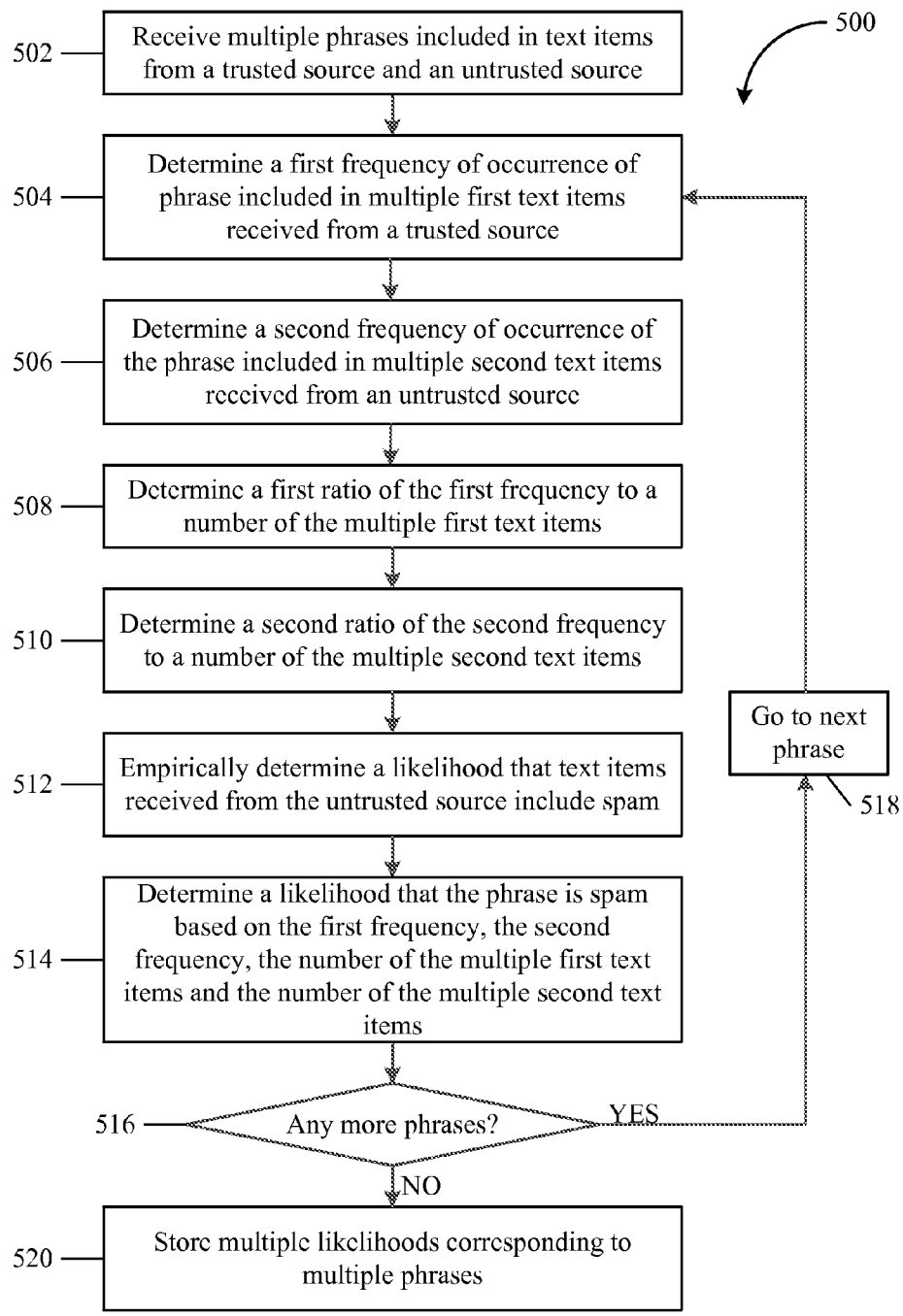
FIG. 5 is a flowchart of a process of determining a likelihood that a phrase received from a source is spam.

FIG. 4 is a flowchart of an example process 400 for assigning a confidence measure to a phrase indicating whether the phrase is a logically coherent phrase. A logically coherent phrase is one that enables deciding if the text item in which the phrase is included is spam. In some implementations, if a frequency of occurrence of a phrase exceeds a threshold frequency, then that phrase is designated as a logically coherent phrase. All such phrases will be considered in likelihood computations. For example, in the text item "website designers in Y," the word "in" likely does not contribute to the spam determination of the phrase, and consequently may not be as logically coherent as "website designers." The process 400 can be implemented as computer software instructions stored on a computer-readable medium and executable by data processing apparatus.

The process 400 receives the multiple text items associated with corresponding multiple business entities from an untrusted source (step 402). The process 400 identifies a phrase (step 404) and a frequency of occurrence of the phrase in the untrusted source (step 406). The process 400 checks if a threshold is satisfied (step 408), i.e., whether the frequency of occurrence of the phrase in the untrusted source satisfies a threshold frequency. For example, if the system 101 determines that the frequency of occurrence of the phrase in the untrusted source is less than 100, then the threshold is not satisfied. The threshold of 100 is an example only, and is variable. If the threshold is not satisfied (decision branch "NO"), the process 400 disregards the phrase as not being important.

If the threshold is satisfied (decision branch "YES"), then the process 400 proceeds to identify a frequency of occurrence of the phrase in the trusted source (step 412). The process 400 associates a confidence measure to the phrase based upon the frequency of occurrence of the phrase in the trusted source (step 414). For example, for the text item "website designers in Y" that is received from the untrusted source, the system 101 determines that a frequency of occurrence of the phrase "website designers" satisfies the threshold. If, for example, a frequency of occurrence of the phrase included in text items received from the trusted source is 40, then the system 101 associates a confidence measure of 40 to the phrase "website designers." Thus, in some implementations, the confidence measure associated with the phrase is a function of the occurrence of the phrase included in the text items received from the trusted source. For example, the confidence measure is a frequency of the occurrence of the phrase.

The system 101 is configured to implement processes 300 and 400 to identify phrases in text items, determine their frequencies of occurrence, and assign confidence measures based on the frequencies, as described above. For each phrase received from an untrusted source, the system 101 is additionally configured to determine a likelihood that the phrase is spam. The system 101 is configured based on the assumption that text items that contain spam will not follow the distribution of frequencies of attributes followed by text items that do not contain spam. Based on this assumption, the system 101 is configured to determine a distribution of frequencies of attributes followed by text items that are received from a trusted source and a distribution of frequencies of attributes followed by text items that are received from an untrusted source.

Assuming that a probability of spam in text items received from a trusted source is 0, the system 101 is configured to determine a probability of spam in a source given a phrase being spam as a function of a probability of spam in a phrase given spam in a source, a probability of spam in a source, and a probability of spam in a phrase. Having determined the probability of spam in the source given a phrase being spam, the system 101 is configured to determine a probability that a phrase is spam given a source based on Bayesian probability. In other words:

$$P(phrase|source) = P(phrase|S) \times P(S) + P(phrase|NS) \times P(NS); \text{ and}$$

P(phrase|NS) is independent of the source, i.e., P(phrase|NS)=P(phrase|no spam), for some sources (i.e., trusted sources),
P(spam-in-source)~0
From the above:

$$P(phrase|source)=P(phrase|S) \times P(S) + P(phrase|NS) \times P'(S), \text{ where}$$

P(phrase|source) is probability of a phrase given a source that contains spam, P(phrase|S) is probability of phrase given spam in source, P(phrase|NS) is probability of phrase given a source that does not contain spam, and P(S) is probability of spam in source. In addition, P'(S) is probability of no spam in source (i.e., 1−P(S)).

From the above, P(phrase|source) and P(phrase|NS) can both be determined by frequency of phrases from the two sources (FIG. 5). Then, there remain two variables in the equation P(phrase|S) and P(S). P(S|phrase) can be determined as:

$$P(S|phrase) = P(phrase|S) \times P(S) / P(phrase). \quad (Eqn. 1)$$

If P(S) is known, then P(S|phrase) can be determined.

In some implementations, the system 101 determines a probability that a phrase is spam based on a first ratio between a count of occurrences of the phrase given a untrusted source and a total count of phrases from that untrusted source (P(phrase|S)), and a second ratio between a count of occurrences of the phrase given a trusted source and a total count of phrases from that trusted source (P(phrase|NS)). For example, the system 101 divides the count of occurrences of the phrase given a trusted source by the total count of phrases from that untrusted source to determine the first ratio, and divides the count of occurrences of the phrase given the trusted source by the total count of phrases from the trusted source to determine the second ratio.

The system 101 then determines a probability of spam in the source (P(S)). To do so, a sample of text items received from the untrusted source is identified, and each of those items is empirically rated as either spam or not spam. For example, the sample of text items can include 1000 text items, and the empirical rating can be performed manually, i.e., by designating each of the 1000 text items as spam or not spam. Pursuant to the designating, if, for example, 200 items of the 1000 items were classified as spam, then the probability of spam in the source is 0.2 (200/1000). For example, if the text item "website designers in Y" was a value of an attribute that represented the title category, then the text item will manually be rated as spam because the text item does not represent a title, but rather represents a category. In another example, even if the text item were in the title category, the text item can be manually rated as spam because a business category should not have specified the location of the business, i.e., "Y."

The system 101 further determines P(phrase) as a ratio of a total count of occurrences of the phrase in all sources to a total count of occurrences of all phrases in all sources. Based on the frequencies and the likelihoods described above, the system 101 determines P(phrase|S), P(phrase|NS), P(S), and P(phrase), and determines P(S|phrase), which represents a likelihood of spam for each phrase received from an untrusted source, from Eqn. 1. For example, from the probability determinations described above, the system 101 can determine that if a title of a business entity includes the phrase "website designers," then 70% of the time, the title will include spam. An example of the process implemented by the system to determine the likelihood is described with reference to FIG. 5.

FIG. 5 is a flowchart of a process 500 of determining a likelihood that a phrase received from a source is spam. The process 500 can be implemented as computer software instructions stored on a computer-readable medium and executable by data processing apparatus. The process 500 receives multiple phrases included in text items from a trusted source and an untrusted source (step 502). The process 500 determines a first frequency of occurrence of a phrase included in multiple first text items received from a trusted source (step 504). The process 500 determines a second frequency of occurrence of the phrase included in multiple second text items received from an untrusted source (step 506).

The process 500 determines a first ratio of the first frequency to a count of the multiple first text items (step 508). The process 500 determines a second ratio of the second frequency to a count of the multiple second text items (step 510). The process 500 empirically determines a likelihood that text items received from the untrusted source include spam (step 512). As described above, the process 500 determines a likelihood that the phrase is spam based on the first frequency, the second frequency, the count of the multiple first text items and the count of the second text items (step 514). For example, the process 500 determines P(phrase|S), P(phrase|NS), P(S), and P(phrase), and determines P(S|phrase), which represents a likelihood of spam for each phrase received from an untrusted source, from Eqn. 1.

The process 500 checks if there are any more phrases (step 516). If there is an additional phrase identified as being included in a text item received from an untrusted source (decision branch "YES"), then the process 500 obtains the next phrase (step 518), and repeats steps 504, 506, 508, 510, 512, and 514. If there are no more such phrases (decision branch "NO"), then the process 500 stores the multiple likelihoods corresponding to the multiple phrases, for example, in a computer-readable and searchable storage medium.

TABLE 1 below shows an example text item, the important phrases included in the text item, likelihoods for each the important phrases, and confidence measures for the important phrases determined by implementing the processes described above.

TABLE 1

| Phrase | Likelihood of spam in phrase | Confidence Measure |
| --- | --- | --- |
| Website designers | 0.7 | 40 |
| Designers in | 0.5 | 15 |
| In Y | 0.8 | 10 |
| Y | 0.6 | 140 |

As described with reference to FIG. 6, the likelihoods associated with the phrases can be used to determine a likelihood that a text item received from a source (for example, a new untrusted source) is spam. In some implementations, when the system 101 receives the new text item from the untrusted source, the system 101 divides the text item into phrases. The system 101 then identifies a probability associated with each phrase. If the phrase was previously received from the untrusted source, then the system 101 can retrieve a previously determined likelihood.

The system 101 can then combine the likelihood for each phrase included in the new text item to arrive at a likelihood for the new text item. To divide the new text item into phrases, the system 101 identifies all phrases for which a likelihood has previously been determined. If the system 101 identifies multiple phrases of different length (i.e., including different count of words), then the system selects the longer phrases. If multiple phrases are of equal length, then the system 101 selects those with the highest confidence measures (FIG. 4).

Thus, whereas a new text item can be divided into a set of phrases, in some implementations, a subset of the phrases can be used to determine the likelihood for the new text item.

So, if the example text item shown in Table 1 is the new text item, the system 101 identifies the longest phrases—"website designers," "designers in," and "in Y." Of the three, the system 101 identifies the phrase with the highest confidence measure—"website designers," thereby eliminating "designers in." Of the two remaining phrases, i.e., "in Y" and "Y," the system 101 identifies "in Y" which is the longer of the two.

Having identified the two phrases in the new text item, the system 101 then identifies frequencies of occurrence and likelihoods that were previously computed for the two phrases. Assuming independence, the likelihoods of the two phrases can be combined based on the following equation:

$$P(spam|XY)=P(XY|spam) \times P(spam)/P(XY)=P(X|spam) \times P(Y|spam) \times P(spam)/[P(X) \times P(Y)],$$

where $X$ and $Y$ are frequencies of occurrence of "website designers" and "in Y," respectively.

So, every phrase in the new text item contributes a boost of P(word|spam)/P(word) to P(spam). The likelihood thus obtained represents a likelihood that the new text item is spam. The likelihood can be compared against a threshold (for example, a threshold spam likelihood). If the determined likelihood satisfies the threshold likelihood, then the system 101 can designate the new text item as spam.

However, the phrases need not be independent, as assumed, and the likelihoods, which should theoretically lie between 0 and 1, can be greater than 1. In such situations, the likelihood can be capped. In sum, conditional independence of the phrases is assumed and a likelihood for each phrase is independently determined. The likelihoods are multiplied by a multiplication factor—P(spam|phrase)/P(spam)—both of which have previously been determined. The likelihoods, multiplied by the multiplication factors, are then multiplied to come up with one score for the new text item.

FIG. 6 is flowchart of a process 600 for determining that business information received from a source is spam. The process 600 can be implemented as computer software instructions stored on a computer-readable medium and executable by data processing apparatus. The process 600 receives multiple phrases included in text items received from untrusted sources, and, for each phrase, a likelihood that the phrase is spam (step 602). The process 604 receives a new text item from an untrusted source (step 604). The process 600 identifies one or more phrases from the new text item (step 606). For each identified phrase, the process 600 identifies a likelihood that the phrase is spam from the received likelihoods (step 608). The process 600 determines that the received new text item is spam from the likelihoods identified for each identified phrase (step 610). The process 600 provides the likelihood that the received new text item is spam (step 612).

In some implementations, the system 101 can determine the likelihood that the new text item is spam based on the phrases identified in the new text item. For example, if the new text item includes two phrases and if the likelihoods that the two phrases are spam are X and Y, respectively, then the system 101 can determine the likelihood that the new text is spam as X+Y−(X×Y).

Also, in some implementations, the system 101 can be configured to use other signals to boost or flatten the likelihoods determined for the new text item. For example, certain phrases are more likely to occur in suffix than in prefix (or vice versa). The system 101 can determine the signals by comparing counts of phrases within the trusted source at different positions. If the system 101 finds that the ratios of the counts of phrases appearing at a particular position in the text item satisfy a threshold, then the system 101 can further boost the likelihood that the new text item is spam. Having determined that the new text item is (or is not) spam, the system 101 can demote/cull a ranking of search results that include information from untrusted sources because the information from such sources likely includes spam. By doing so, the quality of search results provided to users can be improved as such search results likely little or no spam.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Although the figures illustrate a trusted source and an untrusted source, the system 101 can be operatively coupled to additional sources, and can designate more than one source as a trusted source. Further, over time, if the system determines that the likelihood that text items received from an untrusted source are spam is below a threshold, then the system can subsequently designate the untrusted source as a trusted source. Then, the system can use the frequencies determined from text items received from the newly designated trusted source to determine spam likelihoods for other untrusted sources.

In some implementations, the system can solicit business information from the sources. For example, the system can provide electronic forms that list attributes of business entities and that are configured to receive values. In such situations, in addition to sources, users can also provide information describing business entities. In some implementations, the system may not designate a cluster of users as a trusted source, resulting in the cluster of users being an untrusted source. The system can assign confidence measures to clusters of users using techniques similar to those described above. Based on the likelihoods determined for phrases included in text items received from a user, the system can classify business information obtained from a cluster of users as containing or not containing spam. The users in the cluster can have some degree of similarity based on, for example, demographics, category of edits, language, and the like. In some implementations, likelihoods can be combined using a max-likelihood approach.

What is claimed is:

1. A method performed by data processing apparatus, the method comprising:
   determining a first frequency of occurrence of a phrase in a plurality of first text items describing business entities, wherein the first text items are received from a trusted source;
   determining a first ratio of the first frequency of occurrence to a count of the plurality of first text items by dividing the first frequency by the count of the plurality of first items;
   determining a second frequency of occurrence of the phrase in a plurality of second text items describing business entities, wherein the second text items are received from an untrusted source;
   determining a second ratio of the second frequency of occurrence to a count of the plurality of second text items by dividing the second frequency by the count of the plurality of second items;
   determining a likelihood that text items received from the untrusted source include spam;
   determining a likelihood that the phrase is spam based at least partially on the first ratio, the second ratio, and the likelihood that text items received from the untrusted source include spam; and
   determining a likelihood that a different text item received from the untrusted source and that includes the phrase is spam based at least in part on the likelihood that the phrase is spam.

2. The method of claim 1, wherein determining the likelihood that text items received from the untrusted source include spam comprises:
   identifying a subset of the plurality of second text items received from the untrusted source that contain a signal that indicates that each second text item in the subset is spam; and
   determining the likelihood that the text items received from the untrusted source includes spam as a ratio of a count of the second text items in the subset to a count of the plurality of second text items.

3. The method of claim 2, wherein each of the plurality of second text items is associated with an expected first format, the method further comprising:
   determining that a particular second text item is of a second format that is different from the first format and is incompatible with the second format; and
   identifying the particular second text item as a member of the subset of the plurality of second text items that contain a signal that indicates that each of the second text items in the subset is spam.

4. The method of claim 3, wherein the first format is text and the second format is numeric.

5. The method of claim 1, wherein determining that the different text item received from the untrusted source that includes the phrase is spam further comprises:
   determining a plurality of phrases from the different text item, each of the plurality of phrases having a likelihood that the phrase is spam; and
   selecting, from the plurality of phrases, the longest phrases from which the different text item can be constructed; and
   determining that the different text item is spam based on the likelihoods that the selected longest phrases are spam.

6. The method of claim 5, wherein two or more phrases of the longest phrases from which the different text item can be constructed have the same number of words, the method further comprising:
   determining a respective confidence measure for each of the two or more phrases;
   identifying a phrase of the two or more phrases that has a largest confidence measure among the two or more phrases; and
   selecting the identified phrase.

7. The method of claim 6, wherein determining the respective confidence measure for each of the two or more phrases comprises:
   determining a respective frequency of occurrence of each phrase in the plurality of first text items received from the trusted source.

8. The method of claim 1, wherein the plurality of first text items and the plurality of second text items represent titles of business entities.

9. The method of claim 1, wherein the plurality of first text items and the plurality of second text items represent attributes of business entities.

10. A non-transitory computer-readable medium storing computer software instructions executable by data processing apparatus to perform operations comprising:
    determining a first frequency of occurrence of a phrase in plurality of first text items describing business entities, wherein the first text items are received from a trusted source;
    determining a first ratio of the first frequency of occurrence to a count of the plurality of first text items by dividing the first frequency by the count of the plurality of first items;
    determining a second frequency of occurrence of the phrase in a plurality of second text items describing business entities, wherein the second text items are received from an untrusted source;
    determining a second ratio of the second frequency of occurrence to a count of the plurality of second text items by dividing the second frequency by the count of the plurality of second items;
    determining a likelihood that text items received from the untrusted source include spam;
    determining a likelihood that the phrase is spam based at least partially on the first ratio, the second ratio, and the likelihood that text items received from the untrusted source include spam; and determining a likelihood that a different text item received from the untrusted source and that includes the phrase is spam based at least in part on the likelihood that the phrase is spam.

11. The medium of claim 10, wherein determining the likelihood that text items received from the untrusted source includes spam comprises:
identifying a subset of the plurality of second text items received from the untrusted source that contain a signal that indicates that each second text item in the subset is spam; and
determining the likelihood that the text items received from the untrusted source includes spam as a ratio of a count of the second text items in the subset to a count of the plurality of second text items.

12. The medium of claim 11, wherein each of the plurality of second text items is associated with an expected first format, the operations further comprising:
determining that a particular second text item is of a second format that is different from the first format and is incompatible with the second format; and
identifying the particular second text item as a member of the subset of the plurality of second text items that contain a signal that indicates that each of the second text items in the subset is spam.

13. The medium of claim 12, wherein the first format is text and the second format is numeric.

14. The medium of claim 10, wherein determining that the different text item received from the untrusted source that includes the phrase is spam further comprises:
determining a plurality of phrases from the different text item, each of the plurality of phrases having a likelihood that the phrase is spams; and
selecting, from the plurality of phrases, the longest phrases from which the different text item can be constructed; and
determining that the different text item is spam based on the likelihoods that the selected longest phrases are spam.

15. The medium of claim 14, wherein two or more phrases of the longest phrases from which the different text item can be constructed have the same number of words, the method further comprising:
determining a respective confidence measure for each of the two or more phrases;
identifying a phrase of the two or more phrases that has a largest confidence measure among the two or more phrases; and
selecting the identified phrase.

16. The medium of claim 15, wherein determining the respective confidence measure for each of the two or more phrases comprises:
determining a respective frequency of occurrence of each phrase in the plurality of first text items received from the trusted source.

17. The medium of claim 10, wherein the plurality of first text items and the plurality of second text items represent titles of business entities.

18. The medium of claim 10, wherein the plurality of first text items and the plurality of second text items represent attributes of business entities.

19. A system comprising:
data processing apparatus comprising one or more processors; and
a computer-readable medium storing computer software instructions executable by the data processing apparatus to perform operations comprising:
determining a first frequency of occurrence of a phrase in a plurality of first text items describing business entities, wherein the first text items are received from a trusted source;
determining a first ratio of the first frequency of occurrence to a count of the plurality of first text items by dividing the first frequency by the count of the plurality of first items;
determining a second frequency of occurrence of the phrase in a plurality of second text items describing business entities, wherein the second text items are received from an untrusted source;
determining a second ratio of the second frequency of occurrence to a count of the plurality of second text items by dividing the second frequency by the count of the plurality of second items;
determining a likelihood that text items received from the untrusted source include spam;
determining a likelihood that the phrase is spam based at least partially on the first ratio, the second ratio, and the likelihood that text items received from the untrusted source include spam; and
determining a likelihood that a different text item received from the untrusted source and that includes the phrase is spam based at least in part on the likelihood that the phrase is spam.

20. The system of claim 19, wherein determining the likelihood that text items received from the untrusted source includes spam comprises:
identifying a subset of the plurality of second text items received from the s untrusted source that contain a signal that indicates that each second text item in the subset is spam; and
determining the likelihood that the text items received from the untrusted source includes spam as a ratio of a count of the second text items in the subset to a count of the plurality of second text items.

21. The system of claim 20, wherein each of the plurality of second text items is associated with an expected first format, the operations further comprising:
determining that a particular second text item is of a second format that is different from the first format and is incompatible with the second format; and
identifying the particular second text item as a member of the subset of the plurality of second text items that contain a signal that indicates that each of the second text items in the subset is spam.

22. The system of claim 21, wherein the first format is text and the second format is numeric.

23. The system of claim 19, wherein determining that the different text item received from the untrusted source that includes the phrase is spam further comprises:
determining a plurality of phrases from the different text item, each of the plurality of phrases having a likelihood that the phrase is spam; and
selecting, from the plurality of phrases, the longest phrases from which the different text item can be constructed; and
determining that the different text item is spam based on the likelihoods that the selected longest phrases are spam.

24. The system of claim 23, wherein two or more phrases of the longest phrases from which the different text item can be constructed have the same number of words, the method further comprising:
determining a respective confidence measure for each of the two or more phrases;

identifying a phrase of the two or more phrases that has a largest confidence measure among the two or more phrases; and selecting the identified phrase.

25. The system of claim 24, wherein the operations for determining the respective confidence measure for each of the two or more phrases comprises:

determining a respective frequency of occurrence of each phrase in the plurality of first text items received from the trusted source.

26. The system of claim 19, wherein the plurality of first text items and the plurality of second text items represent titles of business entities.

27. The system of claim 19, wherein the plurality of first text items and the plurality of second text items represent attributes of business entities.

* * * * *

UNITED STATES PATENT AND TRADEMARK OFFICE
CERTIFICATE OF CORRECTION

| | |
|---|---|
| PATENT NO. | : 8,332,415 B1 |
| APPLICATION NO. | : 13/049113 |
| DATED | : December 11, 2012 |
| INVENTOR(S) | : Anurag Adarsh and Piyush Janawadkar |

It is certified that error appears in the above-identified patent and that said Letters Patent is hereby corrected as shown below:

Claim 20, Column 18, Line 31 – after "from the" delete "s"

Signed and Sealed this
Ninth Day of April, 2013

Teresa Stanek Rea
*Acting Director of the United States Patent and Trademark Office*